Nov. 23, 1943.                W. L. ROYSTON                2,334,792
                                FISH LURE
                            Filed Aug. 11, 1942

Willard L. Royston INVENTOR.

BY

ATTORNEYS

Patented Nov. 23, 1943

2,334,792

UNITED STATES PATENT OFFICE 2,334,792

FISH LURE

Willard L. Royston, St. Augustine, Fla.

Application August 11, 1942, Serial No. 454,417

3 Claims. (Cl. 43—42)

My invention relates to fish lures, and has among its objects and advantages the provision of a lure contoured in simulation of a shrimp and articulated so as to enhance its likeness to live bait.

Figure 1:
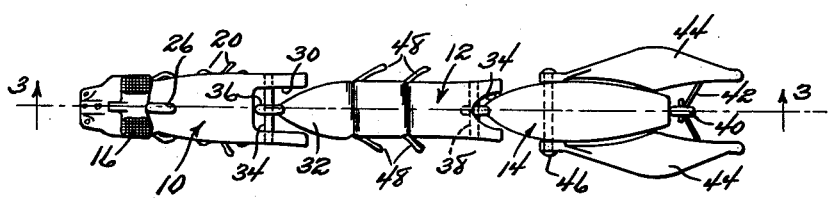
Figure 1 is a top plan view.

In the embodiment selected for illustration, I make use of a head section 10, an intermediate section 12 and a tail section 14. These sections preferably comprise wood and are finished in lacquer in appropriate colors. Eye simulating spots 16 are painted on the head section 10, and a lead weight 18 is attached underneath the front end of the section. Leg elements 20 are also attached to the section 10, which elements may comprise wire. A screw eye 22 is attached to the section 10 as a mount for a gang of fish hooks 24. A similar eye 26 is attached to this section for connection with the usual leader.

Figure 2:
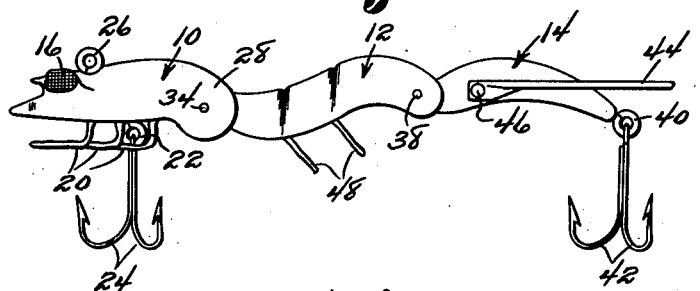
Figure 2 is a side view.
Figure 3:
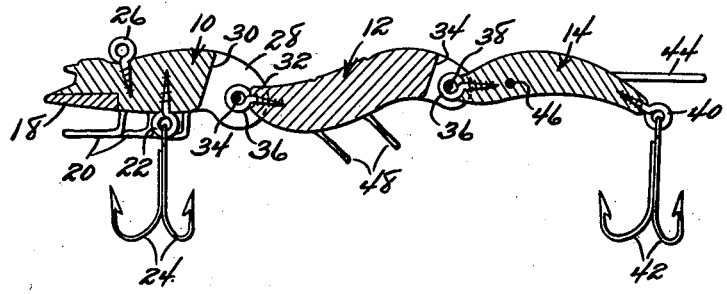
Figure 3 is a sectional view taken along the line 3—3 of Figure 1.

When viewed according to Figures 2 and 3, the section 10 has a downwardly inclined rear end 28 provided with a vertical slot 30 freely receiving the tapered forward end 32 of the section 12. A pin 34, attached to the section 10 and spanning the slot 30, serves as a pivot for a screw eye 36 threaded axially into the end 32 to pivotally connect the sections. Section 12 curves upwardly from its end 32 and then downwardly, with its rear end provided with a vertical slot 34 freely receiving the forward end of the section 14.

A screw eye 36 is threaded axially into the forward end of the section 14 for loose connection with a pin 38 attached to the section 12, to pivotally connect the sections 12 and 14. Section 14 is bowed upwardly and is generally oval shaped when viewed in Figure 1. A screw eye 40 is threaded axially into the rear end of the section 14 to support a gang of fish hooks 42.

Thin metal fins 44 have their forward ends pivotally connected with a pin 46 extending through the section 14. These fins are located on opposite sides of the section 14 and extend short distances rearwardly of the section. Leg elements 48 are attached to the section 12.

This lure comprises a series of sections pivotally connected one with the other. This construction, together with the fins 44, provides a lure having plenty of action. The general contour, color and articulation make up a lure structure having an appearance and action strikingly similar to live bait. This artificial shrimp is slow sinking, thus making it possible to employ it near the surface, or at a considerable depth, as desired.

Without further elaboration, the foregoing will so fully illustrate my invention, that others may, by applying current knowledge, readily adapt the same for use under various conditions of service.

I claim:

1. An artificial fish lure comprising a body made up of a head section, an intermediate section and a tail section, said head and intermediate sections being pivotally connected together and said intermediate and tail sections being pivotally connected together, said head section having a depending rear end and said intermediate section curving upwardly and then downwardly in a rearward direction, said tail section being bowed upwardly, and hooks attached to the head and tail sections.

2. The invention described in claim 1 wherein said head section is provided with a slot in its rear end and in which said intermediate section includes a tapered end positioned freely in the slot, and in which said intermediate section is provided with a slot in its rear end and in which said tail section includes a tapered end extending freely into said last-mentioned slot.

3. An artificial fish lure comprising a body of shrimp-like contour, said body comprising a plurality of sections pivotally connected one with the other, said sections having contours imparting relative movement thereto when the body is pulled through the water, hook means attached to certain of said sections, said body comprising a head section, an intermediate section and a tail section, said head and intermediate sections being provided with slots in their rear ends, pins attached to the head and intermediate sections and spanning the respective slots therein, said intermediate and tail sections having tapered forward ends respectively extending into the slots in said head and intermediate sections, screw eyes threaded into the intermediate and tail sections and loosely embracing the respective pins to pivotally connect the sections, a weight attached to the head section, and fins attached to the tail section.

WILLARD L. ROYSTON.